United States Patent
Roosen et al.

(10) Patent No.: US 7,177,040 B2
(45) Date of Patent: Feb. 13, 2007

(54) REMOTE PRINTER CONTROL

(75) Inventors: Monica Maria Wilhelmina Mathea Roosen, Venlo (NL); Johannes Franciscus Maria Elisabeth Geelen, Baarlo (NL); Frederik De Jong, Weert (NL); Theodoor Johannes Marie Wilbers, Tegelen (NL); Veronika Toumanova, Maastricht (NL); Janine Dorette van Herwaarden, Haag (NL); Eric Petrus Josephus Raijmakers, Boekel (NL); Petrus Antonius Maria Cornelissen, Venlo (NL); René Francois Albert Collard, Gennep (NL)

(73) Assignee: Océ-Technologies B.V., MA Venlo (NL)

( * ) Notice: Subject to any disclaimer, the term of this patent is extended or adjusted under 35 U.S.C. 154(b) by 879 days.

(21) Appl. No.: 09/910,713

(22) Filed: Jul. 24, 2001

(65) Prior Publication Data
US 2002/0036793 A1 Mar. 28, 2002

Related U.S. Application Data

(63) Continuation-in-part of application No. 09/272,126, filed on Mar. 19, 1999.

(30) Foreign Application Priority Data
Mar. 20, 1998 (NL) .................................. 1008660

(51) Int. Cl.
G06F 3/12 (2006.01)
G06K 15/00 (2006.01)

(52) U.S. Cl. .................. 358/1.15; 358/1.13; 358/1.16

(58) Field of Classification Search ................ 358/1.1, 358/1.5, 1.12, 1.13, 1.14, 1.15, 1.18, 1.16, 358/1.17, 1.2, 1.6, 1.9, 1.11, 401, 404, 444, 358/468, 448; 399/8
See application file for complete search history.

(56) References Cited

U.S. PATENT DOCUMENTS

| 5,493,408 | A | | 2/1996 | Kurogane et al. |
| 5,727,135 | A | | 3/1998 | Webb et al. |
| 5,825,988 | A | | 10/1998 | Collard et al. |
| 5,873,659 | A | * | 2/1999 | Edwards et al. ............. 400/61 |
| 5,918,988 | A | * | 7/1999 | H.A.M. Van Oijen ........ 400/76 |
| 5,970,228 | A | * | 10/1999 | Nezu .......................... 713/200 |

FOREIGN PATENT DOCUMENTS

EP 0 749 065 A1 12/1996

* cited by examiner

Primary Examiner—Dov Popovici
(74) Attorney, Agent, or Firm—Birch, Stewart, Kolasch & Birch, LLP

(57) ABSTRACT

In network printing system including workstations and printers interconnected by a network, remotely generated interactive print jobs are stored at the printer and activated from a workstation either through a network-specific interface or a web-browser-based interface. Interactive print jobs are print jobs that are automatically stored in the printer memory and not printed unless they are explicitly activated by a user. Interactive print jobs waiting to be activated are upon request listed on the display screen of the workstation and may be selected by the user. Upon a print command issued at the workstation in respect of one or more selected print jobs, the job data are fetched from the local printer storage and processed by the printer.

26 Claims, 12 Drawing Sheets

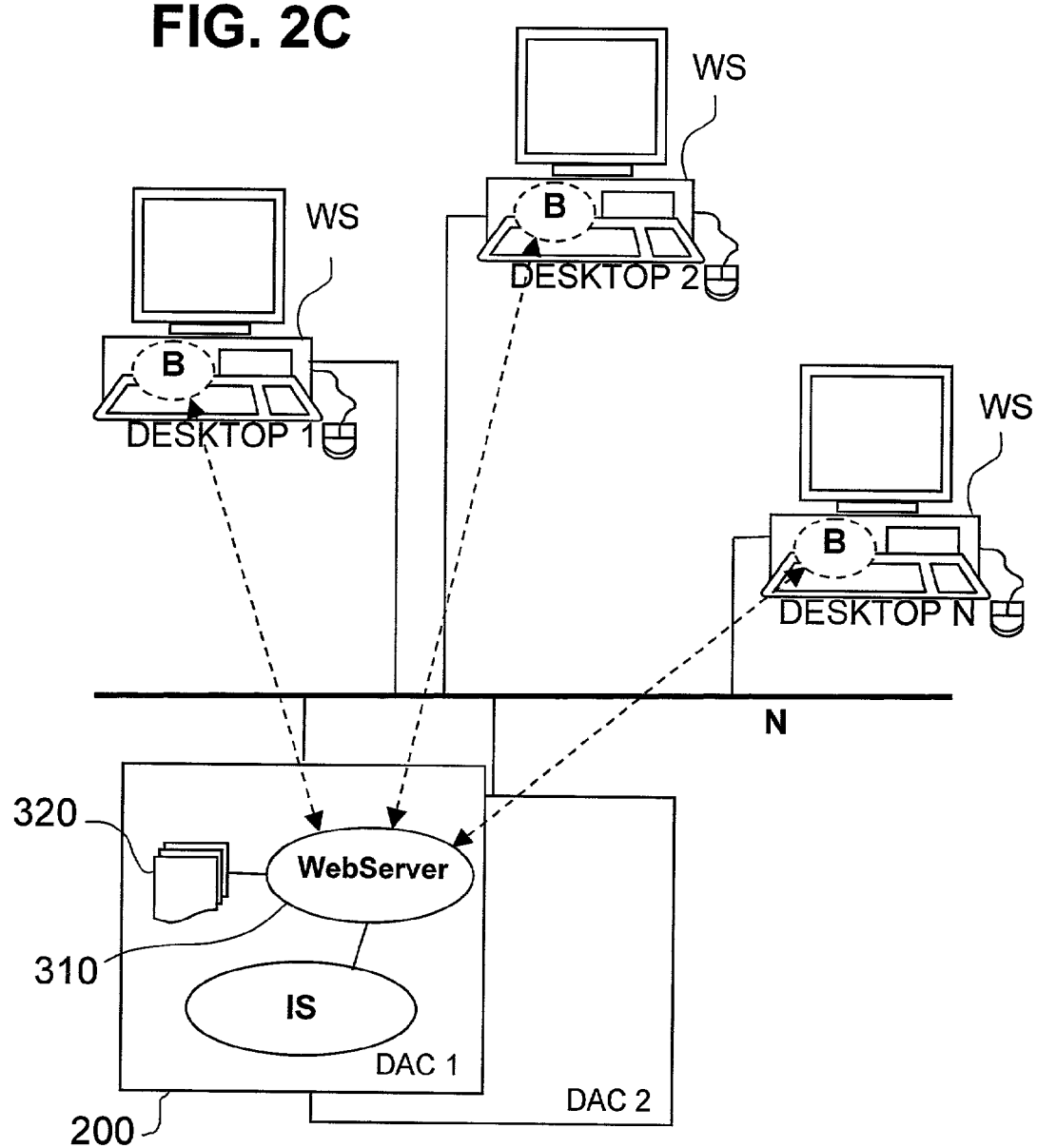

REMOTE PRINTER CONTROL

This application is a continuation-in-part of Application Ser. No. 09/272,126 filed on Mar. 19, 1999, the entire contents of which are hereby incorporated by reference.

FIELD OF THE INVENTION

The invention relates to network printing and, more specifically, a method for printing remotely generated interactive print jobs in a system including workstations at least one printer having a local storage device for storing print files for printing, and a digital network to which the workstations and the printers are connected. The invention also relates to a printing system in which the method is used and to a computer program implementing the method. In this connection, an interactive print job is defined as a print job in which a print file corresponding to the interactive print job is stored in a local storage device in the printer upon reception and not printed, and is, upon an operator command, presented on the display of the operator control panel of the printer for selection and, upon a second operator command, then printed.

BACKGROUND OF THE INVENTION

A method and system according to the invention is known from U.S. Pat. No. 5,825,988. In the known system, interactive print jobs are transmitted to the printer via the network and stored locally at the printer. The n the user walks up to the printer, identifies himself and in reaction is presented with a list of his own stored jobs. He may now select a job from the list and give a print command with respect to the selected print job, whereafter the job is printed. According to the mentioned patent, the rationale of this printing procedure is, that when many users would be able to print directly from their workstations, the printed jobs would rapidly form a cluttered pile from which the user has to extract his own sheets. According to the basic idea behind interactive printing, users are obliged to have their jobs printed in their presence, so that they can take their prints with them at once. For those reasons, it sometimes happens that system managers exclude the possibility for users to print in any other way than interactively.

This printing method, however, has a drawback in that the users, when they have walked up to the printer and started the print process, have to wait until their job is finished. The known method is therefore especially suited for fast printers, so that waiting times are limited.

However, when a user wants to print a large print job, or a number of print jobs, waiting time may become unacceptably long. In that case, it would be advantageous to have a possibility to still start a print job from the workstation.

SUMMARY OF THE INVENTION

Therefore, the present invention, in part, provides a method of printing, in which a user may send print jobs to a printer, where they are stored, and when he is ready to fetch them, give a remote print command for any or all of his jobs.

In order to make this possible, the method according to the invention, in part, includes sending a print job to the printer and storing it as an interactive print job in the local storage device of the printer, listing interactive print jobs currently stored in the local storage device of the printer on the workstation display screen, and enabling an operator, through the use of the workstation operating means, to select a shown interactive print job and to give a command for printing the selected job.

The method according to the invention has the advantage that print jobs may be submitted to the printer at any moment and then be printed, possibly collectively, at a suitable time for the user. When the user is ready to go and collect his prints, he may give a remote print command and when he arrives at the printer, the prints will normally be ready and waiting for him. This form of remote printing from the local printer storage would also be allowable in the case of "forced" interactive printing (i.e. when only interactive print jobs are allowed), because it would influence the users to handle printing more sensibly, printing small jobs interactively at the printer apparatus, and remotely starting large print jobs from their workplace.

An advantageous embodiment of the invention, especially for the case that the number of prints for the job(s) is very large, provides the user with status information of his print jobs, in particular a screen message telling him that his jobs have been finished. The user then knows when he should go and collect his prints.

A special embodiment of the invention includes an implementation of the mechanisms in internet technology, in particular a web server providing the necessary information in the form of web pages and a web browser located in the work station. This has the advantage, that a dedicated printer driver does not have to be installed in the work station, but that instead a standard web browser such as Internet Explorer or Netscape can do the job.

BRIEF DESCRIPTION OF THE DRAWINGS

The invention will now be explained by reference to the following exemplified embodiment and the accompanying drawings wherein:

FIGS. 2B and 2C show second and third embodiments of the invention.

DETAILED DESCRIPTION OF THE PREFERRED EMBODIMENTS

Figure 1:
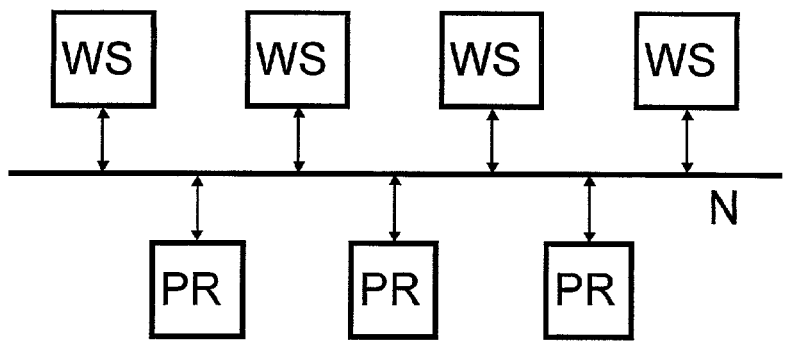
FIG. 1 shows an information-processing system in which the invention is situated.

FIG. 1 shows a system of workstations WS and printers PR connected by a local network N. The workstations are, for example, PC's and are in each case equipped with a processing unit, a screen, a keyboard and a mouse. The printers are digital copying machines, each including a scanner, a printer, an operator control unit and a connection unit (Digital Access Controller or DAC) for connection to the network and processing print jobs sent from the workstations. In addition it is possible to use machines which only have a printer function but also have a control system adapted to the functionality described hereinafter. All these machines, copying machines and printers, are hereinafter referred to as "printer". Users wishing to have a specific data file printed from their workstation, can for the purpose choose from a number of, or even all, the printers of the system.

For the purpose of communication with the printers and the presentation of information relating thereto to the users, there is operative in each connected workstation a program which is hereinafter referred to as "desktop software". This program is personalised, i.e., it works on the instructions of just one user who on starting up has identified himself and input his authorisation code.

The desktop software, hereinafter also referred to as "desktop" for short, is built up from a number of sub-programs diagrammatically illustrated in block 100 in FIG. 2. The core of the desktop software is formed by a sub-program indicated by "virtual printer" (VP), which communicates with the connected printers and updates the properties and status of each of these insofar as this is of interest to the workstation user. As will be explained in the following description, a user can choose how much information he wants to have presented concerning the state of connected printers and the printing files to be processed thereon and at what time. The exchange of data concerning these matters between the desktop software and the printers is limited to what is essential for the user's requirements. This prevents the network from being loaded more than is necessary and in addition the processing capacity of the workstation is not loaded more than necessary, since only the relevant information is present in the workstation and has to be processed.

The "virtual printer" (VP) program is provided with an operator control program, hereinafter referred to as "user interface" (UI), which controls the communication between the user and the desktop software in a manner understandable to the user, in the form of key strokes on the keyboard and windows on the screen, in which windows information is presented and in which the user can select and control the operation of elements via mouse movements. The desktop software is also provided with a communication program COM for controlling data transport from and to the printers via the network.

Figure 2A:
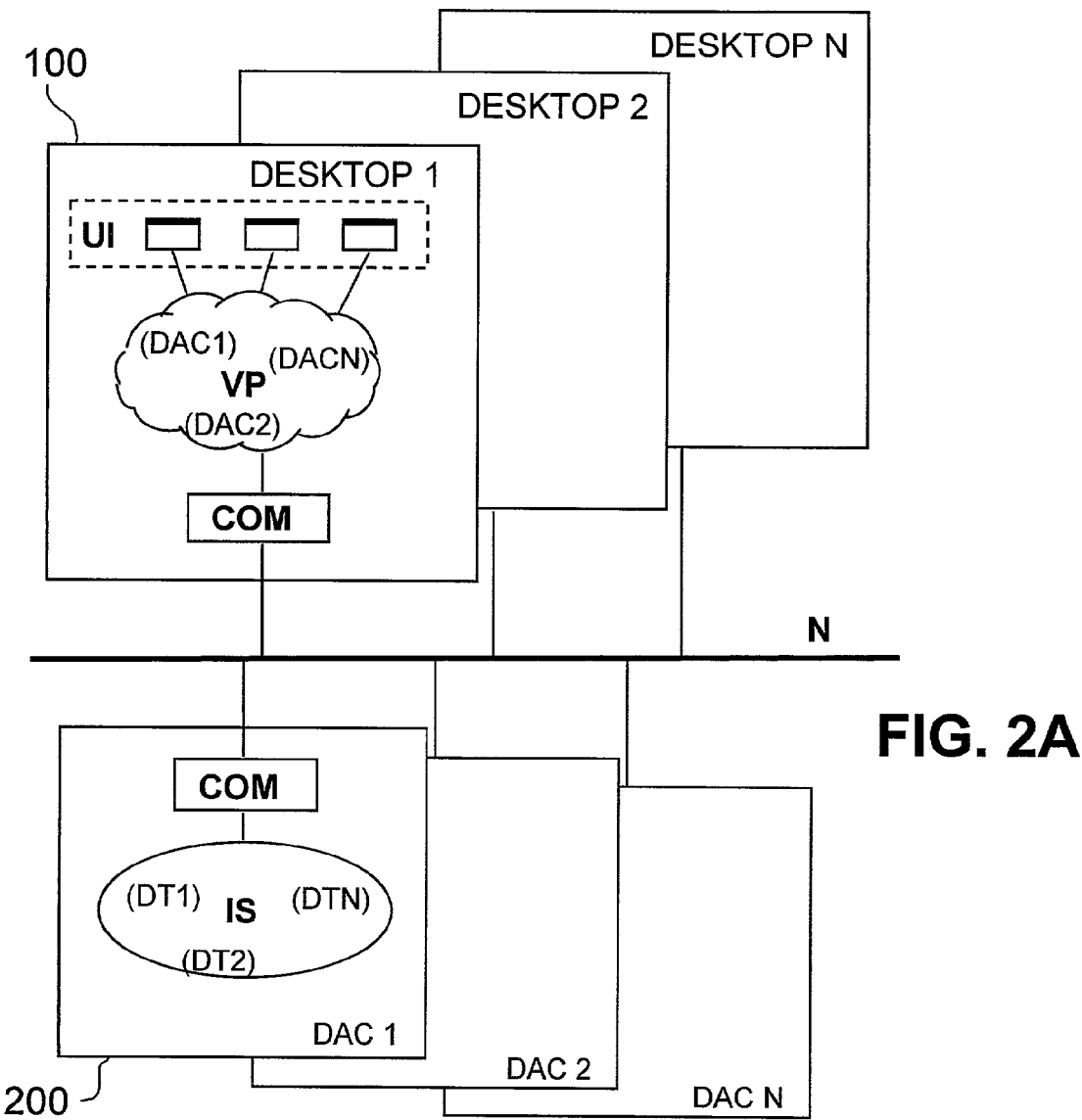
FIG. 2A is a diagrammatic overview of the software according to a first embodiment of the invention.

Block 200 in FIG. 2A gives a diagrammatic illustration of the communication software in the DACs of the printers. This is formed particularly by an "information server" IS, which is intended to receive from and send to workstations digital information such as status information concerning the printer itself and the print jobs that the printer is processing. The information server updates data concerning the information required by each desktop and transmits only that information which is really required, and at the time at which it is required. The information server is also provided with a communication program COM for controlling data transport from and to the desktops via the network.

Files of digital data which are transmitted to a printer via the network for printing by the printer are either of a first or a second type. Files of the first type, hereinafter referred to as automatic print jobs, are required to be printed directly, i.e. without further action by an operator at the printer, while files of the second type, hereinafter referred to as interactive print jobs, must only be stored in the printer memory and must not be printed until an operator at the printer explicitly so requests there by selection with the aid of the operator control means. An attribute added to the file shows the type of file involved.

Processing of a data file of the first type is referred to in this description as automatic printing (AP).

Processing of a data file of the second type is hereinafter referred to as interactive printing (IP). The procedure with this is as follows.

A data file for printing by interactive printing and transmitted by a workstation via the network is received by the DAC. This extracts from the file a number of predetermined identification data, such as the name of the owner and the name of the file itself. The file is then stored unchanged on a storage unit, e.g. a hard disk, in the printer, whereafter the machine passes to the stand-by state in respect of this job.

The DAC manages an administration system containing the identification data of all the data files for printing which are stored. If a new file is supplied via the network, the DAC adds the identification data thereof in the name of the owner/sender to the administration system.

The disk together with the said administration system of the DAC form, as it were, a set of "logic storage spaces" for data files, each logic storage space being allocated to one user. Thus in actual fact storage in a user's logic storage space means that the file is stored on the disk and registered in the administration system in the name of that user. A logic storage space can be protected by a code specific to the owner/user, i.e. in practice an operator can obtain information over the files stored in a specific logic storage space only after he has input this code via the operator control unit of the printer.

If an operator now wishes to have a specific interactive print file printed, then he must select that file by the printer operator control panel and give a print command by actuating a start key. In response thereto the data file is brought up from the disk and converted to printable data, which are processed by the printer to form a print. An interactive print file can be protected by the sender by a code. This code is in the form of an attribute to the print file. If a user wishes to print this file interactively, he must key in the security code at the operator control panel before the file is printed.

When a data file has been interactively printed, it remains in principle stored on the disk and registered in the administration system until it is removed by the user himself or by the printer manager.

The printer manager can bring the machine into a mode in which automatic print jobs are not accepted. In that case, incoming automatic print jobs are converted by the printer into interactive print jobs and stored on the disk.

As already stated, at least a number of the printers in this system are in fact digital copying machines, which can also make a copy of an original document by scanning it and printing the digital image data generated thereby.

There are therefore jobs which are started by a user at the machine itself (copy jobs and interactive print jobs) and jobs which are fed from a distance, e.g. from a workstation (PC) (an automatic print job). In the former case, the printer operates in a command-controlled mode in which the machine starts a reproduction process in response to a start command from the operator control panel, while in the latter case it operates in an autonomous mode in which the machine starts a reproduction process on its own initiative.

A user who has gone to the machine in order to start a job there via the keys finds it very frustrating if a remote-started automatic print job begins just before he wants to start his job. He then has to wait until the remote-started job is finished, or he must at least interrupt that job via an "interrupt" mechanism, before he can make his copy. This frequently occurs in practice, particularly at a machine which is frequently used, and results in annoyance and delay.

In order to protect the position of the user at the machine as much as possible, the machine passes into the command-controlled mode in response to a physical interaction by an operator at the machine, and/or remains there for a predetermined first waiting period. During this waiting period, the machine cannot pass into the autonomous mode. This offers the user at the machine the opportunity of creating, by any interaction, e.g. by actuating a key or placing one or more documents in the machine feed tray, time for himself in order to start his job unhurriedly.

In addition, on completion of the execution of a job in the command-controlled mode, the machine remains in the command-controlled mode for a predetermined second waiting time.

Thus if the user wishes to process further copying or interactive print jobs, he will not be overtaken by an automatic print job. Also during the said second waiting period, the machine cannot pass to the autonomous mode. The second waiting period can be equal to the first. A practical value for waiting periods is, for example, 30 seconds to 2 minutes.

The above-mentioned desktop software will now be described further.

The desktop software comprises the following modules:
An overview of all available connected printers with an indication of their status (hereinafter referred to as: Devices Overview)
An overview of current print jobs with the possibility of intervening in the settings for each job (hereinafter referred to as: Job Control)
Information provision concerning the progress of current print jobs (hereinafter referred to as: Job Monitoring).

The mode information presented by the three modules of the desktop software is dynamic, i.e. it is adapted directly as soon as there is any change in the presented mode.

It should again be noted that the desktop software is personalised and that the information provision and control possibilities are therefore directed towards the wishes of one specific user.

The three program modules referred to can be started from a general start menu which appears when the desktop software is selected on the workstation screen, and will now be described in sequence.

Figure 3:
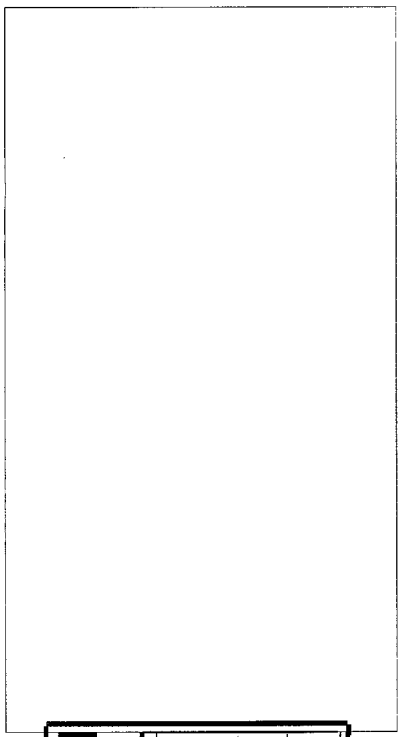
FIGS. 3, 4A–4C, 5, 6A–6B and 7–13 show information windows displayed by the software according to a first embodiment of the invention on the workstation screen.

FIG. 3 shows a window 10 which is displayed on the workstation screen after the user has selected the option "Devices Overview" in the desktop software. This window displays for each printer a symbol indicating the status of that printer. Examples of this are shown in FIG. 3. In addition, each symbol has a short description of the printer so that it is clear which printer is involved.

A first symbol 11 is a stylised illustration of the printer. This symbol indicates that the printer in question is available for print jobs and is at the moment idle. A second symbol 12 shows the printer with a stack of papers over it and indicates that this machine is occupied with an automatic print job in the autonomous mode. Symbol 13 shows the printer with a person in front of it, to indicate that the machine is in the command-controlled mode and hence either occupied with a copy job or an interactive print job or is in the above-described first or second waiting period, in which no automatic print jobs can start. Symbol 14 is an illustration of the printer with, superimposed thereon, a notice board indicating that this printer is in a malfunction state. Symbol 15 is an undetailed illustration of the printer to indicate that this printer is connected but at the present time is not available for copy jobs or print jobs.

From these symbols a user can determine which printer he should send his print job to, and also, when he wishes to carry out a copying or interactive print job, whether the chosen machine is free. Particularly convenient is the differentiated indication of the occupied state, i.e. occupation in the autonomous mode and occupation in the command-controlled mode, because an automatic print job can without difficulty be stopped during operation by a user at the machine, in order to carry out a copy job or interactive print job in an "interrupt" mode, but passing another user at the machine will always require more convincing reasons.

The user can select one of the symbols, and hence one of the printers, and then call up one of the following functions either with a menu in the top bar of the window or with a pop-up menu or the right-hand mouse button:

Displaying the waiting print jobs for the printer concerned; in this function automatic and interactive print jobs are displayed separately and they can also be manipulated. This function forms part of the "Job Control" program module and will be described in detail there. This function can also be called up with a double mouse click on the printer symbol.
Displaying the properties and status of the printer concerned.
Calling up a monitor function which during the work gives information on the display screen concerning the status of the printer concerned.
Defining the printer concerned as the default printer.

Figure 4A:
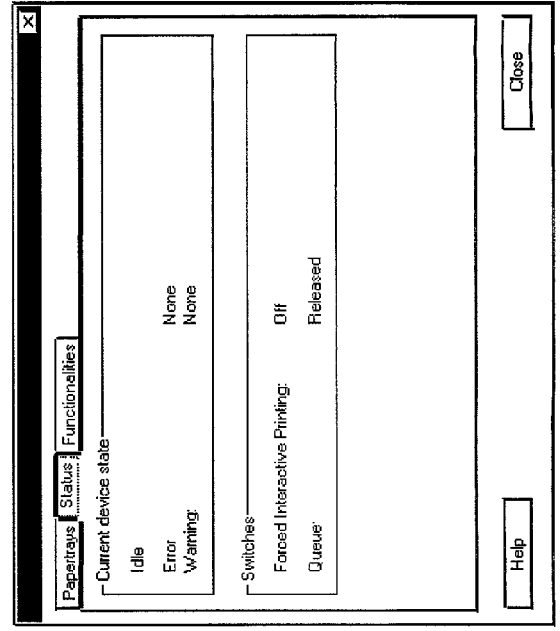

In the above-mentioned function in which the properties and status of the printer are displayed, a window with this information appears on the screen, the information being distributed over three tab cards which can be made visible by selection of their tab, as shown in FIGS. 4A, B and C. The stock of printing paper in the printer trays is displayed on a first tab card, the current state of operation of the printer is described on the second tab card and information as to the installed functionality is shown on the third tab card.

Figure 5:
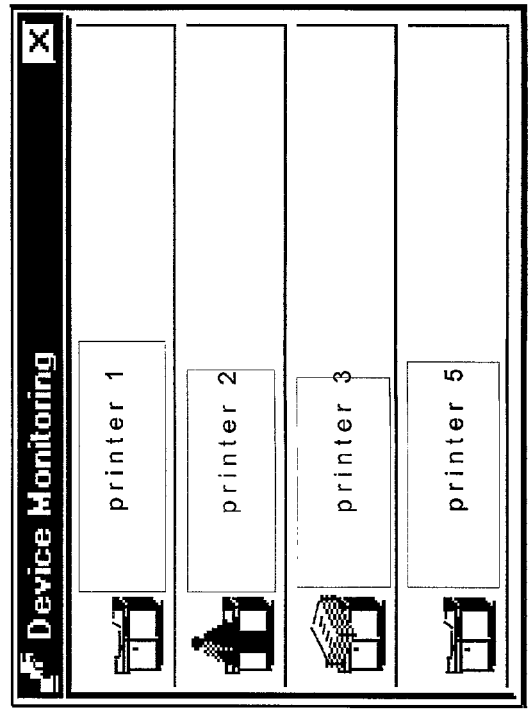

In response to selection of the above-mentioned monitor function, the workstation screen shows a window in which the user can set his preferences for the form of presentation of the printer status data (see FIG. 5). There are two main forms of presentation, namely with a permanent icon on the screen ("by icon") and with messages which appear on the screen at the time that a change of printer status occurs ("by alerts").

Figure 6B:
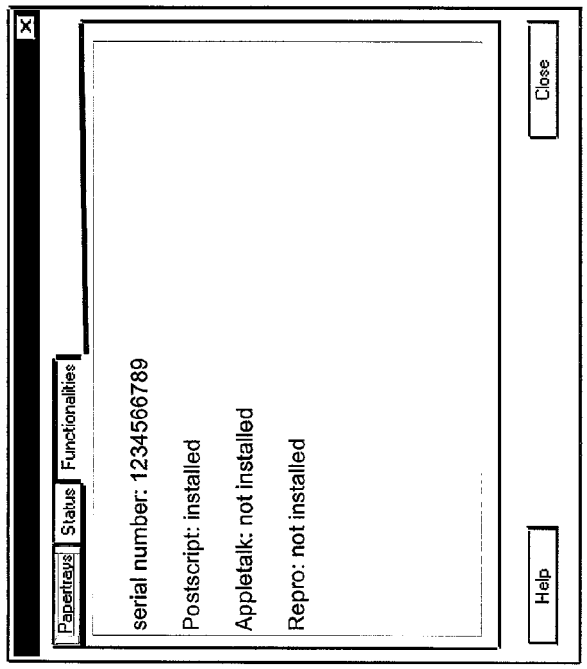
Figure 6A:
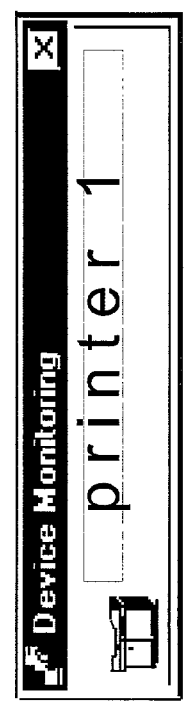

When monitoring with icons is set, the icon displays a symbolic illustration of the status just as shown in FIG. 3. An example of such an icon is given in FIG. 6A. A user can also simultaneously have the status of different printers maintained. In that case, the screen shows an icon for each monitored printer as shown in FIG. 6B. By a double click of the mouse on an icon the function of displaying the waiting print jobs for the printer concerned is called up. In this connection we would again refer to the description of the "Job Control" program module.

Figure 7:
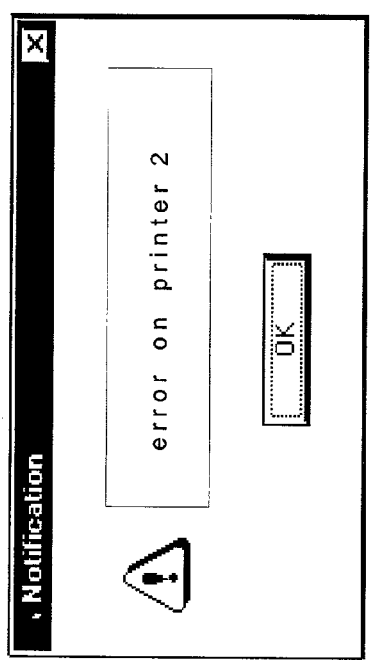

When monitoring is by way of messages, the user can indicate the changes of state for which he wants to receive a message, in order thus to avoid unnecessary reports. An example of a message of this kind is displayed in FIG. 7.

Figure 8:
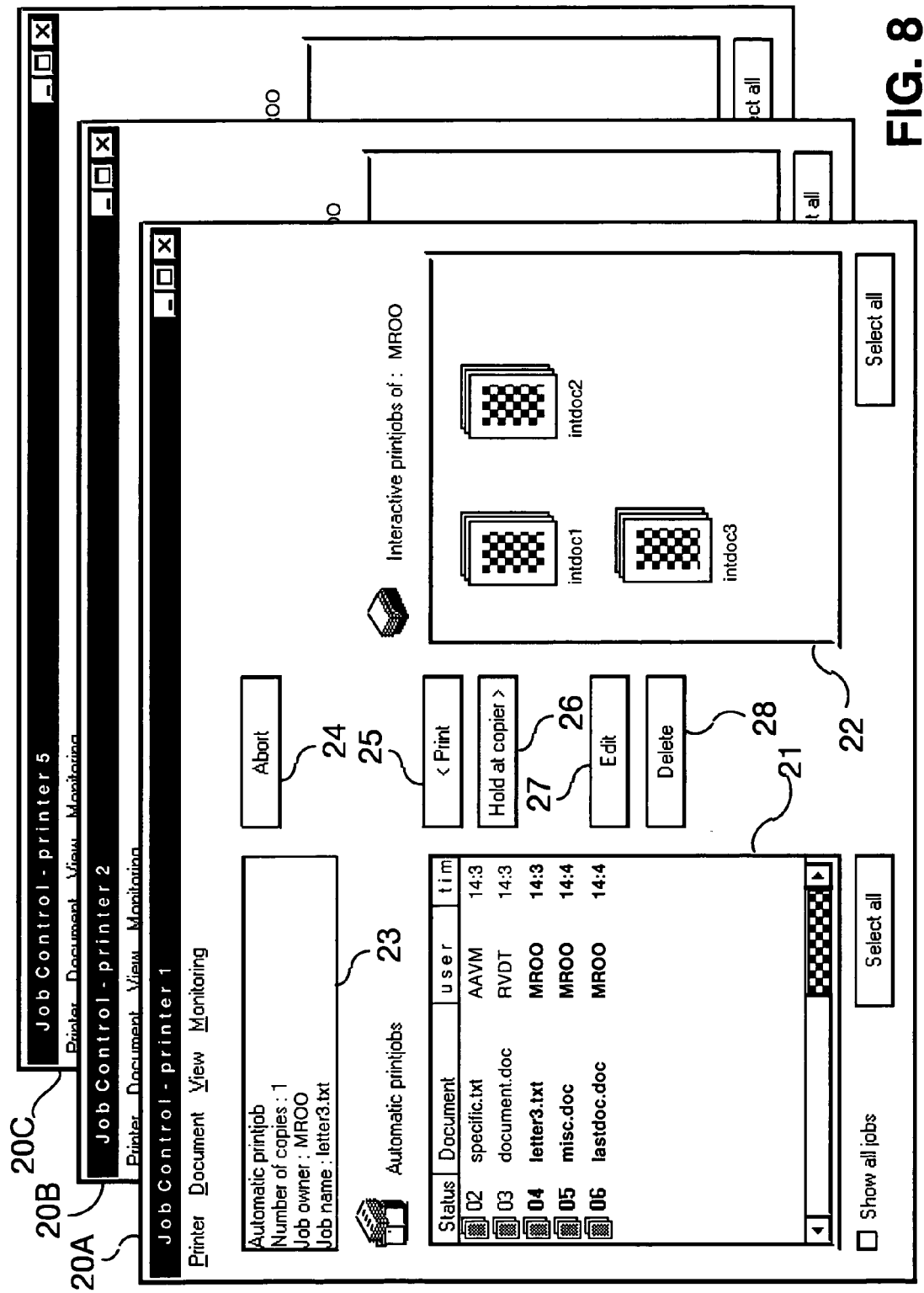

FIG. 8 shows the relevant layout of the workstation screen after the user has selected the "Job Control" option in the desktop software to maintain an overview of current print jobs.

Here a number of windows 20A, 20B and 20C are displayed, each applicable to a printer at which a print job of the user is present at that time. Thus there are as many windows displayed as there are printers at which the user's print jobs are present at that time. If this function was called up from the "Device Overview" module, then only the window for the printer selected there would be displayed.

A window 20 contains a space 21 for automatic print jobs, a space 22 for interactive print jobs of the user, and a space 23 for specifying the active print job. There are also a number of "keys" which can be operated via the mouse.

Space 21 contains the queue of automatic print jobs of the user, with their status (number in the queue), name, and other data to be selected by the user during set-up. By clicking on a switchbox on the left beneath the space 21 the user can also have displayed all the waiting automatic print jobs, i.e. including those of other users. In that case his own jobs are reproduced in a manner which is distinguishable from the others, for example in colour. If the Job Control module is called up from the "Devices Overview" module, for a specific printer, the presentation of all the waiting automatic print jobs, i.e. including those of other users, is the default setting.

Space 22 contains an overview of waiting interactive print jobs of the user, here reproduced with icons with a name, which corresponds to the character of the jobs, which are not in a queue but do not become operative until the user starts them on the operator control panel. To obtain more information concerning these jobs, the user can also have them presented in a detailed list.

Space 23 displays the data of the print job which is active at that time, or, if there is no job active, the state of the printer ("idle", "error"). The space contains the following data: type of job (copying job, automatic print job, interactive print job), number of prints, name of the owner of the job, and the name of the job. Next to the space 23 is a key 24, by which the active job can be discontinued ("abort").

By way of the key 25, an interactive print job selected in the space 22 can be converted to an automatic print job and be added to the queue in space 21, while the key 26 can convert an automatic print job selected in space 21 into an interactive job and move it to space 22.

By way of key 27, the print settings can be displayed for a print job selected in either of the spaces 21 or 22. The same effect is achieved by double clicking of the mouse on the job name. In response to this, a window is opened on the screen of the workstation, displaying all the settings. The settings can also be changed in this window.

Finally, a print job selected in either of the spaces 21 or 22 can be removed by way of key 28.

The above functions can also be called up by selecting a job and choosing from the "document" menu in the menu bar above the window 20 or by selecting in a pop-menu which appears when the right-hand mouse button is clicked on a job name.

The functions explained with reference to the keys 24–28 can be used by the user only for his own print jobs.

The "View" menu in the menu bar above the window 20 offers the following options:

- Selection of the form of presentation of automatic print jobs (choice of which information is displayed)
- Selection of the form of presentation of interactive print jobs (as icons or in a list and, if a list is chosen, what information is displayed)
- Display of all print jobs of the user (over all the printers), with the printer on which the job is present, plus this information concerning the print jobs that have already been finished.

Figure 9:
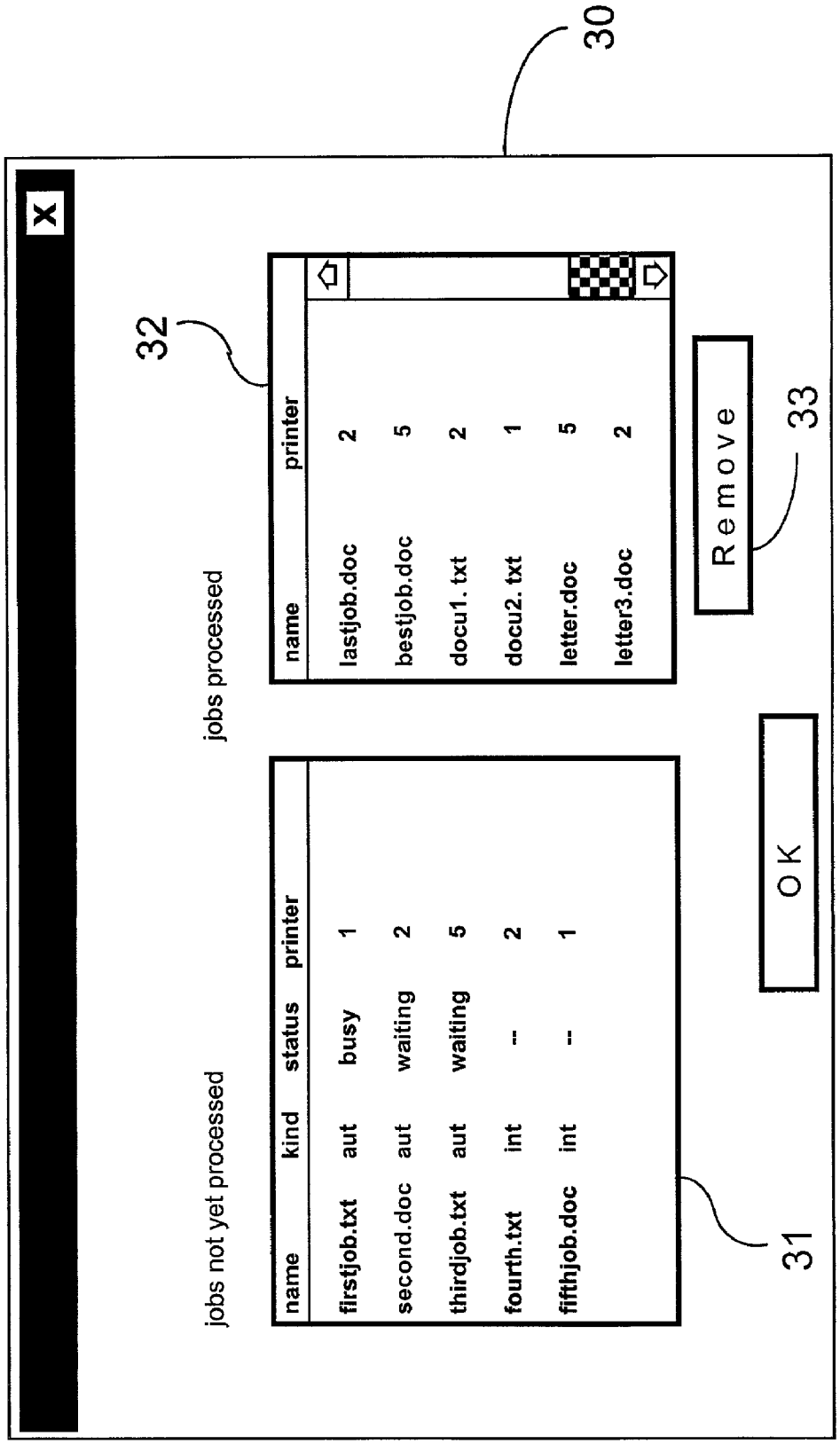

This latter function will now be explained with reference to FIG. 9.

When this function is selected, the screen at the workstation displays the window 30. This window 30 contains a space 31 in which there is displayed a list of all the print jobs which have not yet been finished for the user concerned, on all the printers, with their status (waiting, busy, error) and the printer at which they are present. This list shows both automatic and interactive print jobs and their type. Double clicking of the mouse on the name of a print job in space 31 opens the Job Control window (FIG. 8) of the printer where the job is present, so that the user can see the status of the job in the queue (if it is an automatic print job), can manipulate the job, and can inspect and/or change the print settings.

The window 30 also contains a space 32 displaying a list of all the finished print jobs of the user concerned, on all the printers, with the printer which processed them. A key 33 is provided beneath the space 32 to enable the user to remove from the list a print job after he has selected this by clicking with the mouse.

If a list is too long in space 31 or 32 to fit in that space, a scroll bar appears so that the jobs not fitting in the window can still be reached.

The list of finished print jobs in space 32 can also give a status indication although this is not shown here. In the case of a printer with more than one delivery tray, the printer machine control system knows the delivery tray in which the prints have been deposited and this information can be displayed in the list. The printer can also be provided with sensors to determine whether there are prints in the delivery trays. In that case, the machine control system can also note that a delivered stack of prints is taken from the tray. This information can also be displayed in the list in space 32. The status information can have the form of: "present in delivery tray X", or "removed".

By this function a user can always find out where his print jobs are in the queue or where his prints are situated, this being extremely convenient particularly in an environment in which a number of printers are used.

The monitor function can also operate for just a specified sub-set of all the printers in the system. This can be set when the system is configured, or by a set-up function of the program.

The "monitor" menu in the menu bar above the Job Control window 20 offers the opportunity of activating a monitor function for the print jobs of the user concerned on the printer concerned. This function can also be called up from the start menu of the desktop software and will be described hereinafter.

The monitor function is intended to keep the user informed as to the status of his automatic print jobs. It can be operative for all the current jobs or for some of the jobs, as selected by the user.

The monitor function has three modes:

- A first mode ("active"): there is still at least one job of the set which has not been completed; also included is the number of jobs that have not yet been finished.
- A second mode ("passive"): all the jobs of the set have been finished or the set is empty.
- A third mode ("error"): one of the jobs has caused an error.

Figure 10:
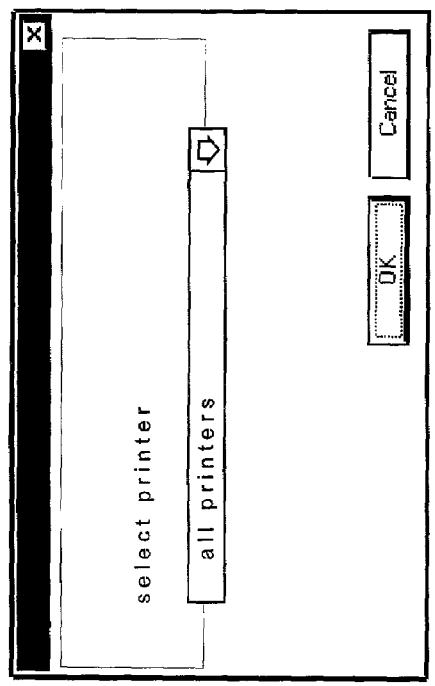

In response to the selection of the monitor function in the start menu of the desktop software, the workstation display screen displays a window in which the user can select one, more, or all the printers for the monitor function. This is shown in FIG. 10. After the user has clicked the "OK" key with the mouse, the workstation display screen displays a window in which the user can set his preferences for the form of presentation of the status of his personal print jobs (see FIG. 11). There are two main forms of the presentation, namely by using a permanent icon on the screen ("by icon") or by using messages which appear on the screen when there is any change in that status ("by alerts"). In the latter case the user can indicate the changes of status for which he wants to receive a message in order thus to avoid unnecessary reports.

The user inputs his preferences and presses the "OK" key, whereafter the function is activated. An icon now appears on the screen if the icon mode was selected.

Figure 11:
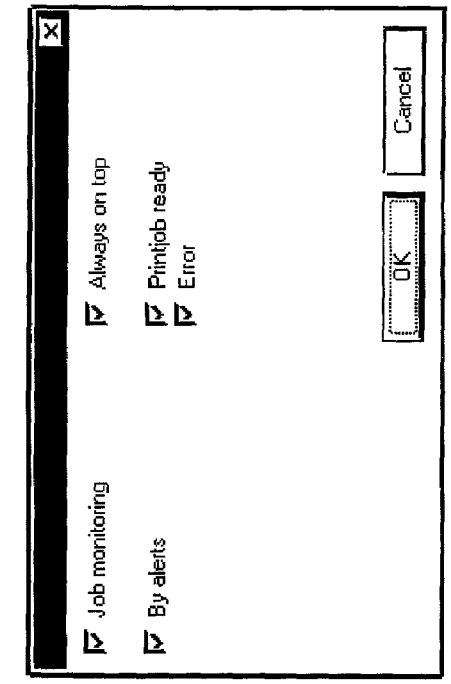

When Job Monitoring is activated from Job Control, the selection window of FIG. 10 is skipped (the printer of the Job Control window is automatically selected), but the window of FIG. 11 is immediately displayed.

Figure 12:
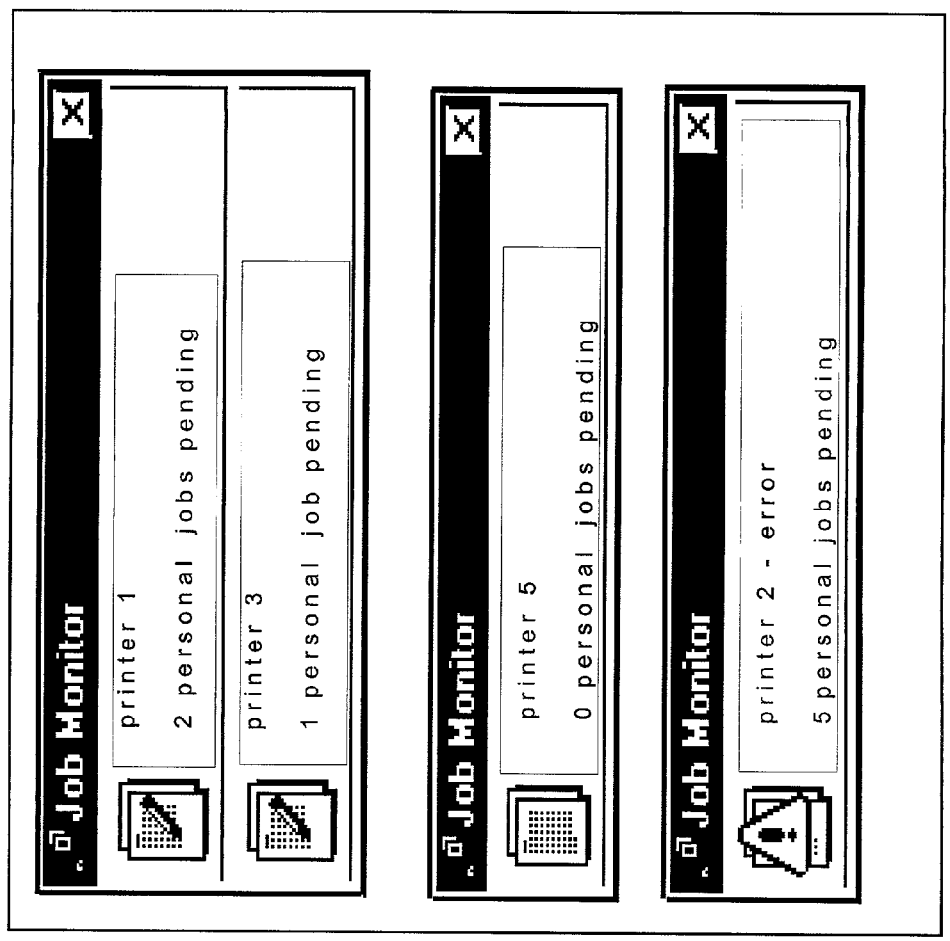

FIG. 12 shows monitor icons. In addition to the name of the printer for which it is active, an icon contains a symbol showing the status of a set of print jobs of the user on that printer. In this example, the following symbols are displayed for the above-mentioned three states:

For the first state ("active"): an illustration of a document with a pen;

For the second state ("passive"): an illustration of a document;

For the third state ("error"): a notice board in front of a document.

The said set of print jobs monitored by the monitor function can be the complete set of jobs on the printer concerned, but it can alternatively be a sub-set. This sub-set can only be selected in the Job Control window 20, space 21, by clicking the required print jobs with the mouse, followed by clicking the monitor menu in the menu bar. When Job Monitoring is called up from the start menu of the desktop software, the set always contains all the jobs. The monitor function is dynamic: print jobs can be added to a monitored set.

In response to a double click of the mouse on a monitoring icon, the Job Control window of the printer concerned is opened, so that the user can inspect the complete status of his jobs.

A plurality of icons can also be displayed simultaneously on the screen, so that the user can inspect the status of different sets or printers simultaneously.

Figure 13:
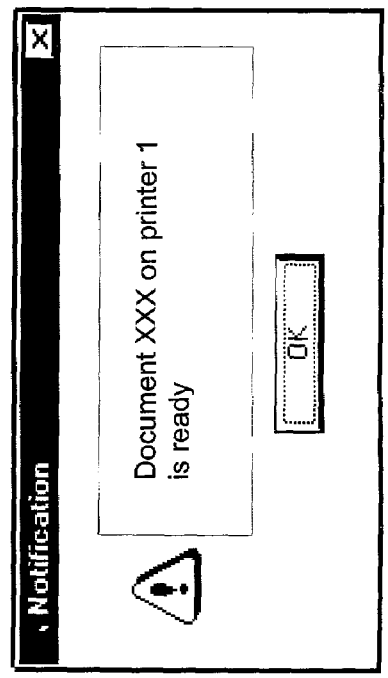

If the "by alerts" mode is selected, message windows appear only if there is a user-selected change of status of a print job from the set. An example of such a window is shown in FIG. 13.

The present invention may also be implemented using internet technology, in which information from the printers is transmitted to a web browser in a user workstation in the form of dynamically compiled internet pages. Two alternative embodiments of the invention using internet technology are shown in FIGS. 2B and 2C, respectively.

Figure 2B:
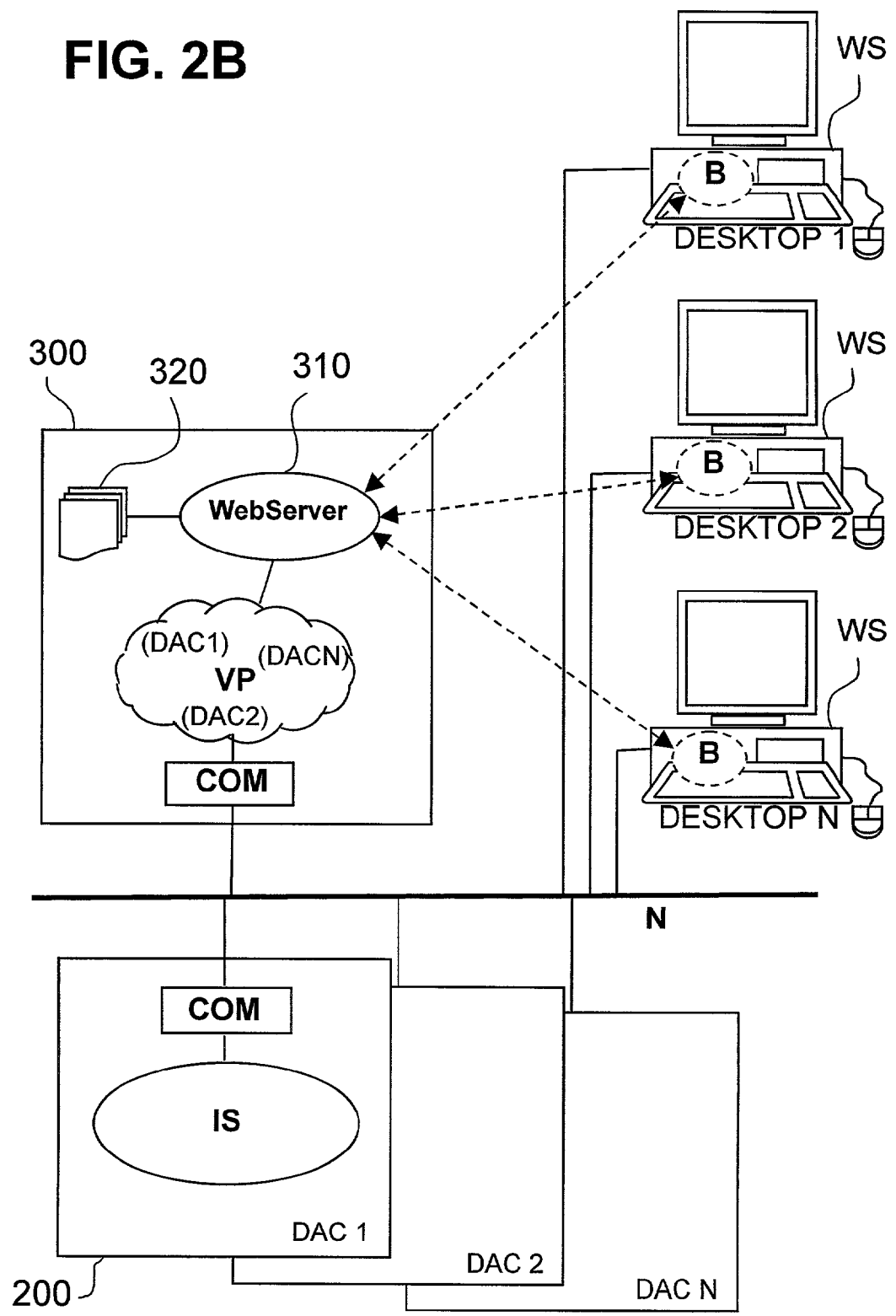

In the embodiment shown in FIG. 2B a server 300, which may be embodied by a PC connected to the network N, includes the Virtual Printer VP as described above with reference to FIG. 2, and a web server 310. For instance, one of the workstations WS in FIG. 1 may be suitably programmed to act as server 300. All of the user workstations (DESKTOP i) have a standard web browser B that is able to contact the web server 310 and ask for specific information, i.c. on the printers and print jobs. On a request from a web browser B located in one of the user workstations, the web server 310 dynamically prepares a web page containing the requested information and sends the prepared web page to the requesting browser. The web server has a set of web pages (320) available for different browser requests. An example of a web server of the kind described, available on the market, is the MICROSOFT INTERNET INFORMATION SERVER made commercially available by the MICROSOFT Corporation, using so-called "Active Server Pages", but also other possible implementations are known to the skilled person.

Figure 14:
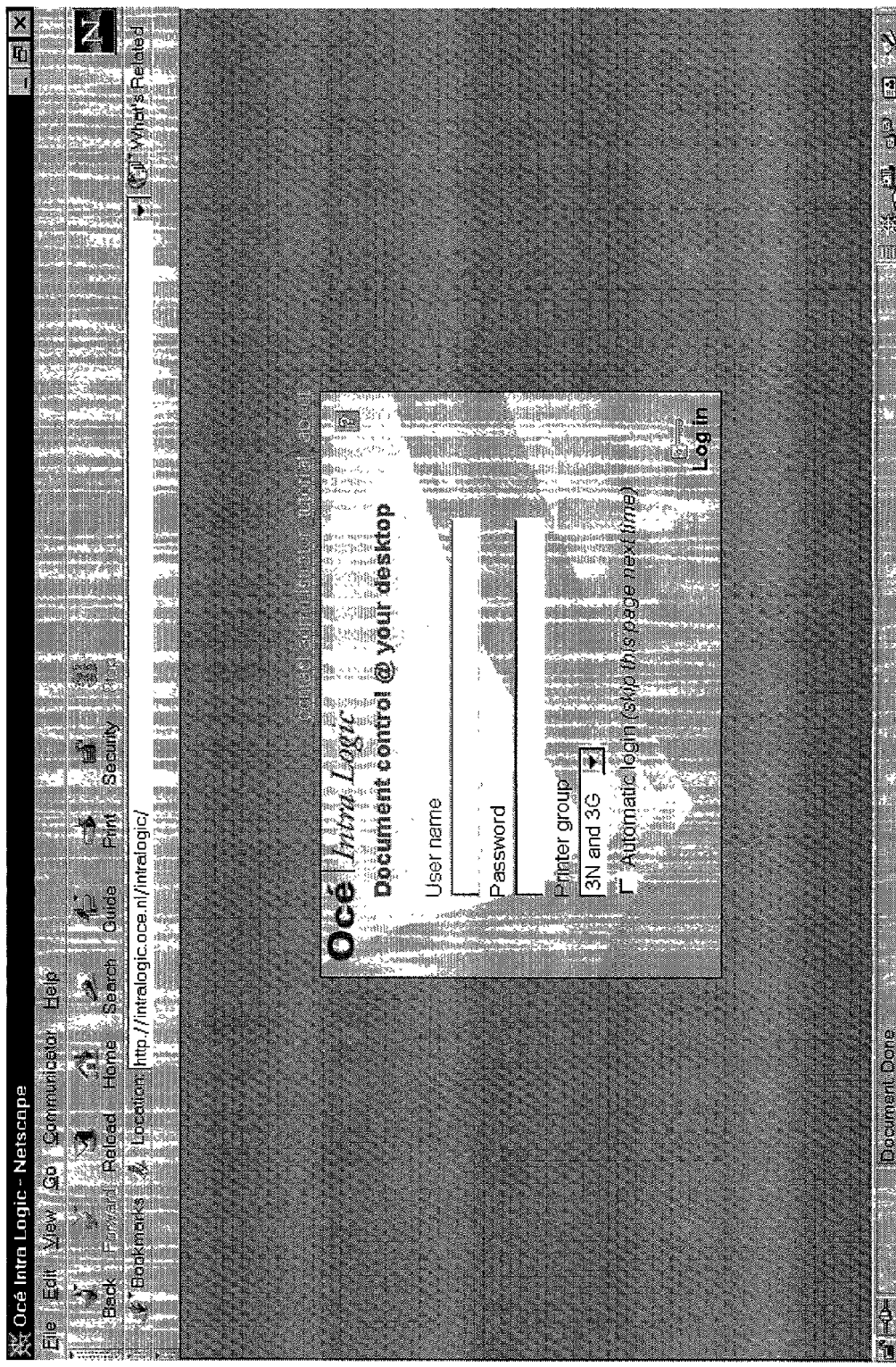
FIGS. 14–16 show information windows (dialog boxes) displayed by software according to the second and third embodiments of the invention.

The information presented in the web pages is largely the same as that described above for the first embodiment with reference to FIG. 2. In addition, FIG. 14 shows a "login" page (a dialog box) for a user to gain access to the information in the web server. This login page is returned by the web server 310 when a browser contacts the web address of the web server 310. The login page contains boxes for the user to fill in his login name and password for authorisation. Upon return of the filled-in login page, the session is personalized for the specific user. In another embodiment or mode, a login name entry may be sufficient for authorisation.

Figure 15:
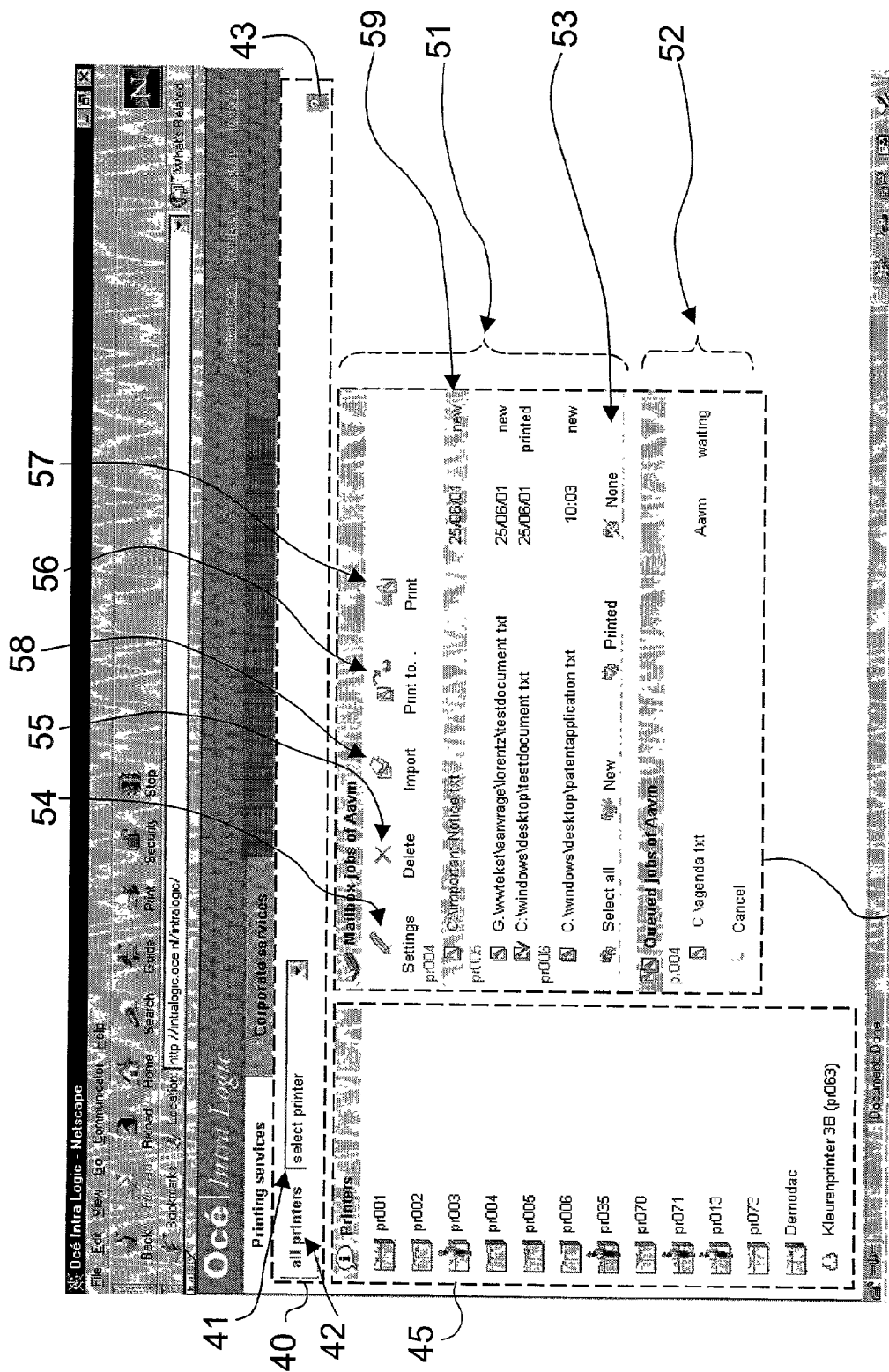

Other web pages correspond to the windows shown in FIGS. 3, 4A–C, 8 and 9. Also, the information shown in several ones of the said windows may be consolidated in one web page containing different frames. For instance, an exemplary basic web page is shown in FIG. 15.

Figure 4B:
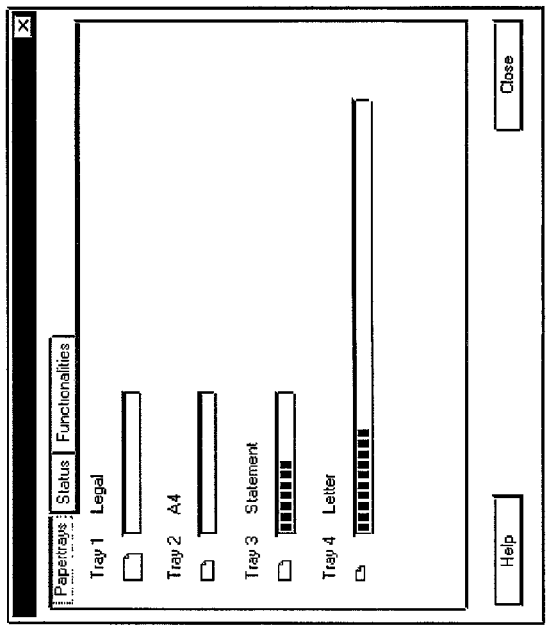
Figure 4C:
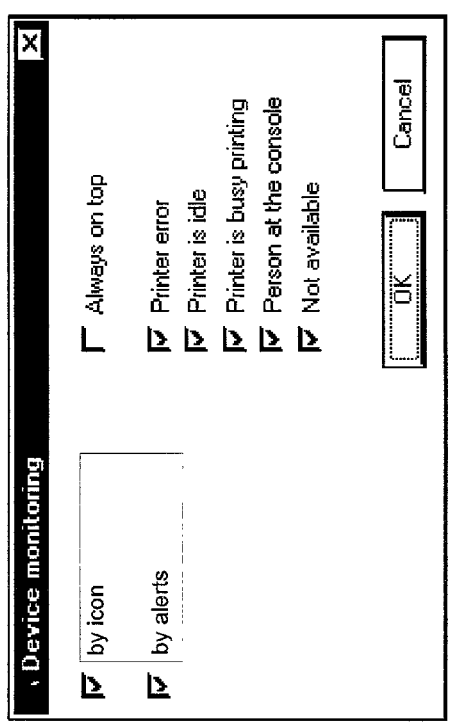

This page contains three frames, shown here surrounded by broken lines.

a navigation frame 40 includes buttons for selecting one specific printer (pull-down menu 41) or all printers (42) of the group of printers for which the user is authorized. Further, this frame contains a "help" button 43. Clicking on this button makes a pop-up window appear containing information on the printing services.

a "device status" frame 45 presents information on the printers of the group, including their statuses. In the case that the "all printers" button in the navigation frame 40 has been selected, frame 45 shows icons for all of the printers, corresponding to the "devices overview" window of FIG. 3. In the case that a specific printer has been selected from pull-down menu 41, information on that specific printer, corresponding to FIG. 4A–C, is presented in this frame. A specific printer may also be selected by clicking on the icon of that printer in frame 45.

a "job control" frame 50 presents the list (51) of interactive print jobs (called "mailbox jobs" in this example) of the user and a print queue (52). In the case that the "all printers" button in the navigation frame 40 has been selected, the list 51 specifies all interactive print jobs of the user on all printers, grouped per printer, and the print queue 52 specifies all print jobs of the user, also grouped per printer. In the case that a specific printer has been selected, the list 51 specifies the interactive print jobs of the user on that printer only, and the print queue 52 now specifies all pending print jobs of that printer, including jobs of other users (the latter jobs are presented in a distinguishable, e.g. gray, font). After an interactive print job has been printed, it is put back into the list 51, where it remains until it is actively deleted by the user or automatically after a prespecified time. It is, however, identified as "printed".

It is to be noted that the network N in FIG. 2A (and for that matter FIG. 2B) through which a workstation WS connects can include, in part, the internet. This alternative can, e.g., be used: to the advantage of a user working at home that wants to print a document whose hard copy is not immediately needed and/or is too large for the user's home printer; or to the advantage of a visitor to a company who has a portable computer and desires to print through the company's network but to whom more direct network access is not, or should not be made, available.

Figure 16:
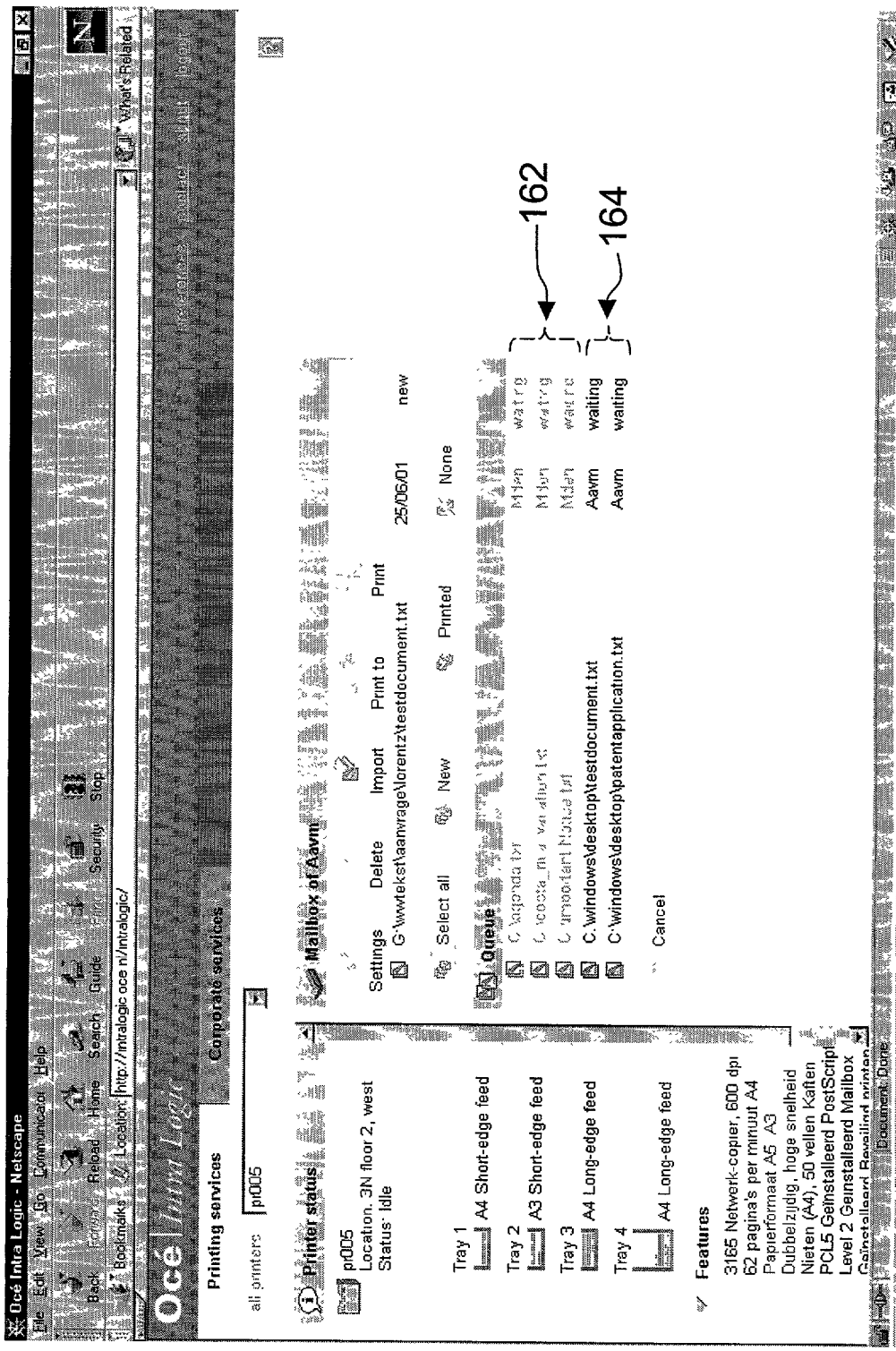

FIG. 16 shows the web page in the case that a specific printer has been selected. Again in FIG. 16, the jobs of the user and any other user are displayed together. The jobs of other users are displayed in a distinguishable font 162 relative to the font 164 associated with the user.

List 51 also contains buttons 53 for selecting or deselecting all or part of the user's interactive print jobs, and buttons 54–57 for operating on a specific selected job (59), namely, editing the job's settings (54), deleting the job (55), transferring the job to another printer (56) and starting the print process for the job (57). An "Import" button 58 is for importing a print-ready print file from the user's workstation into the list of the user's interactive print jobs stored in the specific printer. When selected, it opens a dialog page, in which a file address and print settings can be filled in.

Of course, a web server cannot of its own motion send a web page (e.g. when the status of a print job or the status of a printers changes). Therefore, the exemplary web page of FIG. 15 contains a script that makes the browser ask for updated frames at predetermined time intervals. The refresh intervals are different for different frames and different situations. For instance, the "device status" frame 45 is refreshed every 5 seconds. The "job control" frame 50, which normally does not change so rapidly, is refreshed every 60 seconds, but when the user has one or more jobs in the print queues and thus will be more interested in the actual situation, refresh time is 15 seconds. Further, any action of the user automatically provokes an update of the associated frame.

The button 57 (corresponding to the button 25 in FIG. 8) is for giving a print command for an interactive print job in the list that has been selected by the user by clicking on it or otherwise. Upon the operation of the soft print command button, the browser sends the relevant information to the web server 310. The latter passes on the print command and the job-id of the selected print job(s) to the printer, and this in turn changes each selected print job into an automatic print job and adds it to the print queue. Also, the web server sends a confirmation frame to the browser to take the place of the "job control" frame 50, which confirmation frame contains a script that makes the browser request a new "job control" frame. In reaction on the new request, the web server 310 compiles an updated "job control" frame that now lists the selected print job in the print queue. As is usual in PC technology, several print jobs may be selected at one time. These jobs are then processed collectively upon one print command.

FIG. 2C shows a different implementation of a web-enabled embodiment of the invention, in which the web server is built into each printer. In this embodiment, the virtual printer process VP is no longer necessary and has therefore been suppressed. Consequently, the web server can only inform the browser of the status of its own printer and of print jobs residing in that printer. Thus, a presentation as shown in FIG. 16 would still be possible. Of course, this embodiment is especially suitable for environments containing only one or a small number of printers.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method for printing remotely generated interactive print jobs in a system including
    a workstation provided with a processor unit, a display screen, and operating means,
    a printer provided with a control unit, an operator control panel, a display and a local storage device for storing print files for printing, and
    a digital network to which the workstation and the printer are connected,
    wherein an interactive print job is for deferred processing, in which a print file corresponding to the interactive print job is stored in the local storage device of the printer upon reception and not printed, and is, upon an operator command, presented on the display of the operator control panel of the printer and, upon a second operator command, then printed,
    the method comprising:
    sending a print job to the printer and storing the print job as an interactive type in the local storage device of the printer;
    listing one or more interactive print jobs currently stored in the local storage device of the printer on the workstation display screen; and
    enabling an operator at the workstation side to use the workstation operating means for selecting one of the listed interactive print jobs currently stored in the local storage device of the printer and for giving a direct command to the printer for printing the selected job at the printer.

2. The method according to claim 1,
    wherein an interactive print job for which a print command has been given via the workstation operating means is added to a local printer queue of said printer.

3. The method according to claim 1,
    in which a print job may alternatively be of an automatic type in contrast to the interactive type, an automatic print job being for processing by the printer without an operator command to do so, the automatic print job being queued in a local printer queue of the printer,
    wherein said method also comprises:
    listing one or more automatic print jobs currently waiting in the local printer queue on the workstation display screen, and
    enabling an operator, through the use of the workstation operating means, to select one of the listed automatic print jobs and to convert the selected automatic print job into an interactive print job.

4. The method according to claim 1,
    wherein print jobs of a user are handled exclusively by the user.

5. The method according to claim 4,
    further comprising informing the user of the status of print jobs belonging to the user.

6. The method according to claim 5,
    further comprising informing the user of the finishing of print jobs belonging to the user by an alert message on the workstation display screen.

7. The method of claim 1,
    said method being implemented using internet technology, including a webserver communicating with the printer and a web browser in the workstation.

8. The method of claim 7,
    further comprising providing said webserver with a web page generator for dynamically generating a web page presenting selectable references to interactive print jobs belonging to a user and a print command function for commanding printing of at least one of said interactive print jobs.

9. The method according to claim 1,
in which a print job may alternatively be of an automatic type in contrast to the interactive type, an automatic print job being for processing by the printer without an operator command to do so, the automatic print job being queued in a local printer queue of the printer,
wherein said method also comprises automatically converting, in a selectable printer mode, all automatic print jobs into interactive print jobs upon reception at the printer.

10. A printing system for printing remotely generated interactive print jobs, the system comprising:
a workstation provided with a processor unit, a display screen, and operating means,
a printer provided with a control unit, an operator control panel, a display and a local storage device for storing print files for printing,
a digital network to which the workstation and the printer are connected,
wherein an interactive print job for deferred processing, in which a print file corresponding to the interactive print job is stored in the local storage device of the printer upon reception and not printed, and is, upon an operator command, presented on the display of the operator control panel of the printer and, upon a second operator command, then printed,
said workstation processor unit including a print control module for communication with the printer, for sending print jobs to the printer and receiving information from the printer,
wherein said print control module is also operable for listing interactive print jobs currently stored in the local storage device of the printer on the workstation display screen, and for enabling an operator at the workstation side to use the workstation operating means for selecting one of the listed interactive print jobs currently stored in the local storage device of the printer and for giving a direct command to the printer for printing the selected job at the printer.

11. The system according to claim 10,
wherein the printer control unit, upon reception from the workstation of a signal designating a locally stored interactive print job and specifying a print command, adds the designated interactive print job, to a local printer queue of the printer.

12. The system according to claim 10,
in which a print job may alternatively be of an automatic type in contrast to the interactive type, an automatic print job being for processing by the printer without an operator command to do so, the automatic print job being queued in a local printer queue of the printer,
wherein said print control module in the workstation processor unit further is operable for:
listing on the workstation display screen automatic print jobs currently waiting in the local printer queue of the printer, and
enabling an operator, through the use of the workstation operating means, to select one of the listed automatic print jobs and to convert the selected automatic print job into an interactive print job.

13. The system according to claim 10,
wherein said print control module in the workstation is personalised for a specific user such that handling of personal print jobs of said specific user is exclusively available to said specific user.

14. The system according to claim 13,
wherein said print control module in the workstation is also for informing the user of the status of print jobs belong to the user.

15. The system according to claim 14,
wherein said print control module in the workstation is also for informing the user of the finishing of print jobs belonging to the user by an alert message on the workstation display screen.

16. The system according to claim 10,
including a plurality of printers, and wherein the print control module in the workstation is adapted to communicate with all of the printers and to provide the stated print control functionality for all of the printers.

17. The system according to claim 10,
in which a print job may alternatively be of an automatic type in contrast to the interactive type, an automatic print job being for processing by the printer without an operator command to do so, the automatic print job being queued in a local printer queue,
wherein the printer has a selectable mode in which it automatically turns all automatic print jobs are automatically converted into interactive print jobs upon reception.

18. A printing system for printing remotely generated interactive print jobs, the system comprising:
a workstation provided with a processor unit, a display screen and operating means, and including a web browser,
a printer provided with a control unit, an operator control panel, a display and a local storage device for storing print files for printing,
a web server having a print control module for communication with the printer and for receiving information from the printer,
a digital network to which at least the workstation and the web server are connected,
wherein an interactive print job is for deferred processing, in which a print file corresponding to the interactive print job is stored in the local storage device of the printer upon reception and not printed, and is, upon an operator command, presented on the display of the operator control panel of the printer and, upon a second operator command, then printed,
wherein said web server is adapted for dynamically generating web pages for transmission to a browser in a workstation, said web pages listing a user's interactive print jobs currently stored in the local storage device of the printer, and including functionality for enabling a user at the workstation side to use the workstation operating means for selecting one of the listed interactive print jobs currently stored in the local storage device of the printer and for giving a direct command to the printer for printing the selected job at the printer.

19. The system of claim 18,
wherein said web server is adapted for sending a signal designating a locally stored interactive print job and specifying a print command to the printer, and
wherein the printer control unit, upon reception of said signal adds the designated interactive print job to a local printer queue of the printer.

20. The system of claim 18,
wherein the web server is a separate unit in the system, said web server being connected to the printer or to a plurality of printers through the network.

21. The system of claim 18,
wherein the web server is located in the printer and directly connected to the printer control unit.

22. A computer program, having a computer-readable form and being embodied on a computer-readable medium, for use in a printing system for printing remotely generated interactive print jobs, said system including: a workstation provided with a processor unit, a display screen, and operating means; a printer provided with a control unit, an operator control panel, a display and a local storage device for storing print files for printing; a digital network to which the workstation and the printer are connected; and an interactive print job being for deferred processing, in which a print file corresponding to the interactive print job is stored in the local storage device of the printer upon reception and not printed, and is, upon an operator command, presented on the display of the operator control panel of the printer and, upon a second operator command, then printed, said computer program comprising:

computer program code for running in said workstation;

computer program code for communication with the printer including sending print jobs to the printer;

computer program code for listing one or more interactive print jobs currently stored in the local storage device of the printer on the workstation display screen; and computer program code for enabling an operator at the workstation side to use the workstation operating means for selecting one of the listed one or more interactive print jobs currently stored in the local storage device of the printer and for giving a direct command to the printer for printing the selected job.

23. The computer program according to claim 22,
in which a print job may alternatively be of an automatic type in contrast to the interactive type, an automatic print job being processed by the printer without an operator command to do so, the automatic print job being queued in a local printer queue, wherein said program is also adapted for listing one or more automatic print jobs currently waiting in the local printer queue on the workstation display screen, and enabling an operator, through the use of the workstation operating means, to select one or more of the listed automatic print jobs and to convert the selected automatic print job into an interactive print job at the printer.

24. The computer program according to claim 22,
wherein said program is personalised for a specific user such that handling of personal print jobs of said specific user is exclusively available to said specific user.

25. The computer program according to claim 24,
wherein said program is also adapted for informing the user of the status of print jobs belong to the user.

26. The computer program according to claim 25,
wherein said program is also adapted to inform the user of the finishing of print jobs belonging to the user by an alert message on the workstation display screen.

* * * * *